(12) United States Patent
Annicchiarico et al.

(10) Patent No.: US 6,247,148 B1
(45) Date of Patent: *Jun. 12, 2001

(54) SERVER EXTENSION FOR A COMPUTER SYSTEM

(75) Inventors: Richard Francis Annicchiarico, Penacook; Robert Todd Chesler, Nashua; Alan Quentin Jamison, Milford, all of NH (US)

(73) Assignee: Compaq Computer Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/071,049

(22) Filed: Jun. 1, 1993

Related U.S. Application Data

(63) Continuation of application No. 07/444,728, filed on Nov. 30, 1989, now abandoned.

(51) Int. Cl.[7] .................................................. G06F 11/00
(52) U.S. Cl. ............................. 714/45; 714/39; 710/15
(58) Field of Search .......................... 395/500; 371/16.5, 371/19; 714/45.39; 710/15

(56) References Cited

U.S. PATENT DOCUMENTS

| | | |
|---|---|---|
| 3,585,599 | 6/1971 | Hitt et al. . |
| 3,958,111 | 5/1976 | Hackett . |
| 4,084,235 | 4/1978 | Hirtle et al. . |
| 4,166,290 | 8/1979 | Furtman et al. . |
| 4,205,370 | 5/1980 | Hirtle . |
| 4,437,184 | 3/1984 | Cork et al. . |
| 4,564,903 * | 1/1986 | Guyette et al. ................... 395/425 |
| 4,589,068 * | 5/1986 | Heinen, Jr. ........................ 371/19 |
| 4,617,663 * | 10/1986 | Lake et al. ........................ 371/19 |
| 4,703,416 * | 10/1987 | Crupi et al. ..................... 395/425 |
| 4,734,853 | 3/1988 | Nakano . |
| 4,763,242 | 8/1988 | Lee et al. . |
| 4,768,150 * | 8/1988 | Chang et al. ..................... 395/275 |
| 5,022,028 * | 6/1991 | Edmonds et al. ................ 271/476 |
| 5,058,000 * | 10/1991 | Cox et al. ................... 364/DIG. 1 |
| 5,067,107 * | 11/1991 | Wade ................................ 395/500 |
| 5,086,393 * | 2/1992 | Kerr et al. ......................... 371/19 |
| 5,142,679 * | 8/1992 | Owaki et al. ..................... 371/19 |

OTHER PUBLICATIONS

IBM Technical Disclosure Bulletin, vol. 28, No. 12, May 1986, New York, US; pp. 5573–5574; *Collect Host/Network Traffic at VTAM Control Point.*

Computer, vol. 8, No. 11, Nov. 1975, Long Beach US, pp. 51–61; G. J. Nutt et al., *Tutorial: Computer System Monitors.*

The Xlib Validation Test Suite T7 Release Notes date unknown.

Islam et al., "Testing Window Systems," 28th Annual Technical Symposium, Washington DC, Aug. 23, 1989.*

Software Research, Inc., "Cap Bak," San Francisco, CA, 1989.*

Keefe, D. D., "Hierarchical Control Programs for System Evaluation," IBM Systems Journal, vol. 7, No. 2, 1968, pp. 123–133.*

* cited by examiner

*Primary Examiner*—Richard L. Ellis
(74) *Attorney, Agent, or Firm*—William J. Kubida; Francis A. Sirr; Hogan & Hartson LLP

(57) ABSTRACT

A server extension architecture provides means for intercepting input events and output protocol requests. Remote terminal emulation on an XWindows system is possible. The architecture comprises a portion of memory in the server extension which is identical to a portion in memory in the server where the server stores the addresses of input and output handling routines. By swapping these addresses with addresses in the server extension portion of memory, the server extension intercepts input and output, for monitoring a server or an application program or controlling a workstation. The server extension architecture is operated under the control of an application program.

2 Claims, 4 Drawing Sheets

SERVER EXTENSION FOR A COMPUTER SYSTEM

This application is a continuation of application Ser. No. 07/444,728, filed Nov. 30, 1989 now abandoned.

FIELD OF THE INVENTION

This invention relates generally to an architecture for a server extension used in a computer system and in particular to an architecture for a server extension for intercepting input events and protocol requests generated by an application program. The intercepted input events and protocol requests are subsequently used for any purpose, for example determining the time lapse between the input event and the protocol request for evaluating the performance of the server and/or the application program.

BACKGROUND

The server is the part of a computer system's architecture that functions as the interface between the computer or central processing unit and the user. It is desirable to test or evaluate the performance of the server for various purposes. For example, long delays between a user input and the system response can be detected and subsequently eliminated. Similarly, it is desirable to test and evaluate application programs running on the central processor unit of the computer for many purposes.

Common methods of performance testing a server involve the use of video cameras or stop watches. In one such method the user or operator working at a terminal and the terminal screen are filmed by a video camera. Thereafter the video is replayed on a machine that displays time as a function of the film speed. Performance metrics are then calculated based upon the difference between the displayed time of a starting film event and an ending film event. The performance metrics for each timed event are then recorded. In another method, the step of calculating performance metrics comprises manually timing response times with a stop watch. In either method, the performance metrics for all of the timed events are then analyzed to determine the performance of the applications or server. This same approach is also used to determine the performance of the server for a single or specific input event. This procedure is time-consuming, tedious, and prone to error. Furthermore, this procedure requires actual operation by the user at a workstation. Thus, simulated user input is impossible. Furthermore, since actual user input is inconsistent from one operation to the next, it is impossible to have consistent input from run to run.

Another way of testing the performance of an application program or a server in response to input events or protocol requests is with remote terminal emulation (RTE). RTE dispenses with a live user or operator for sending input to the server or the application program and replaces the operator with software generated input events which are loaded onto the server input event queue. However, prior attempts at RTE on servers of the X window type systems have failed to provide a way to intercept output generated protocol requests by the server or the application. Furthermore, none of these attempts have supported receiving simulated input from a remote source, i.e., a source that sends input over a non x transport link, such as network or asynchronous terminal line. Thus, these prior attempts at RTE cannot test system configurations involving networks, modems and other peripheral devices.

SUMMARY OF THE INVENTION

The present invention is an architecture for a server extension used in a computer system. An extension is a software module that performs server functions and has access to the server variables but is not a permanent part of the server. The server extension intercepts user input events before they are received by the application program (also called a client), writes or stores information about the input, including the type of input and the time it was intercepted, into a client defined location. The client defined location can be any type of storage such as a sequential file. The storage can be local or at a remote location and be connected over a modem line, a terminal line or a network line. Furthermore, the server extension intercepts output protocol requests generated by the application program before they result in visible changes to the screen display of a terminal. An output protocol request is a signal generated by an application program and sent to the server, which causes the server to draw text or graphics on the screen of a terminal. The server extension also writes or stores information about the output protocol request including the type of request and the time it was intercepted, into a client defined location. The client defined location can be any type of storage such as a sequential file. The storage can be local or at a remote location and connected over a modem line, a terminal line or a network line. Finally, the server extension is capable of receiving input from user operated input devices such as the mouse or keyboard of a workstation or simulated input from the controlling client.

The server extension architecture as described above intercepts input events and protocol requests which are used to enable the controlling client to monitor a server or the application program or to control a workstation for example testing the performance of applications, system configurations, and user interfaces. The data structures of the server extension architecture are configured in a portion or block of memory and mimic or are substantially identical to the data structures of the server which are configured in a different portion or block of memory. In addition the server extension architecture of the present invention is operated under the control of the client or application program. Thus, while the server extension architecture is described in relation to the well known X server operating system program, it can also be implemented with any other operating system.

The server extension architecture also provides RTE, remote terminal emulation and is capable of receiving simulated input from a remote source. For example the server extension architecture provides RTE capability for the X Window System which is a well known operating system documented in R. W. Scheiffler, J. Gettys, and R. Newman. *X Window System*. Digital Press (1988). The server extension architecture also provides a quick, inexpensive means for software regression testing, and competitive or interoperability testing of applications among different hardware and software platforms. The server extension architecture also facilitates computer-based instructions where it is important to monitor a user's interaction at a terminal and be able to demonstrate correct interactions. It further facilitates trade show demonstrations where the demonstrator need not understand the application being demonstrated or needs to concentrate on the customer rather than the demonstration. As is apparent from the above examples the server extension architecture of the present invention can be used for a wide variety of purposes which will be apparent to those skilled in the field.

BRIEF DESCRIPTION OF THE DRAWINGS

FIG. 2 shows the data structures of the server extension of this invention as well as the data structures of the X server which the extension has access to.

DESCRIPTION OF THE PREFERRED EMBODIMENT

Figure 1:
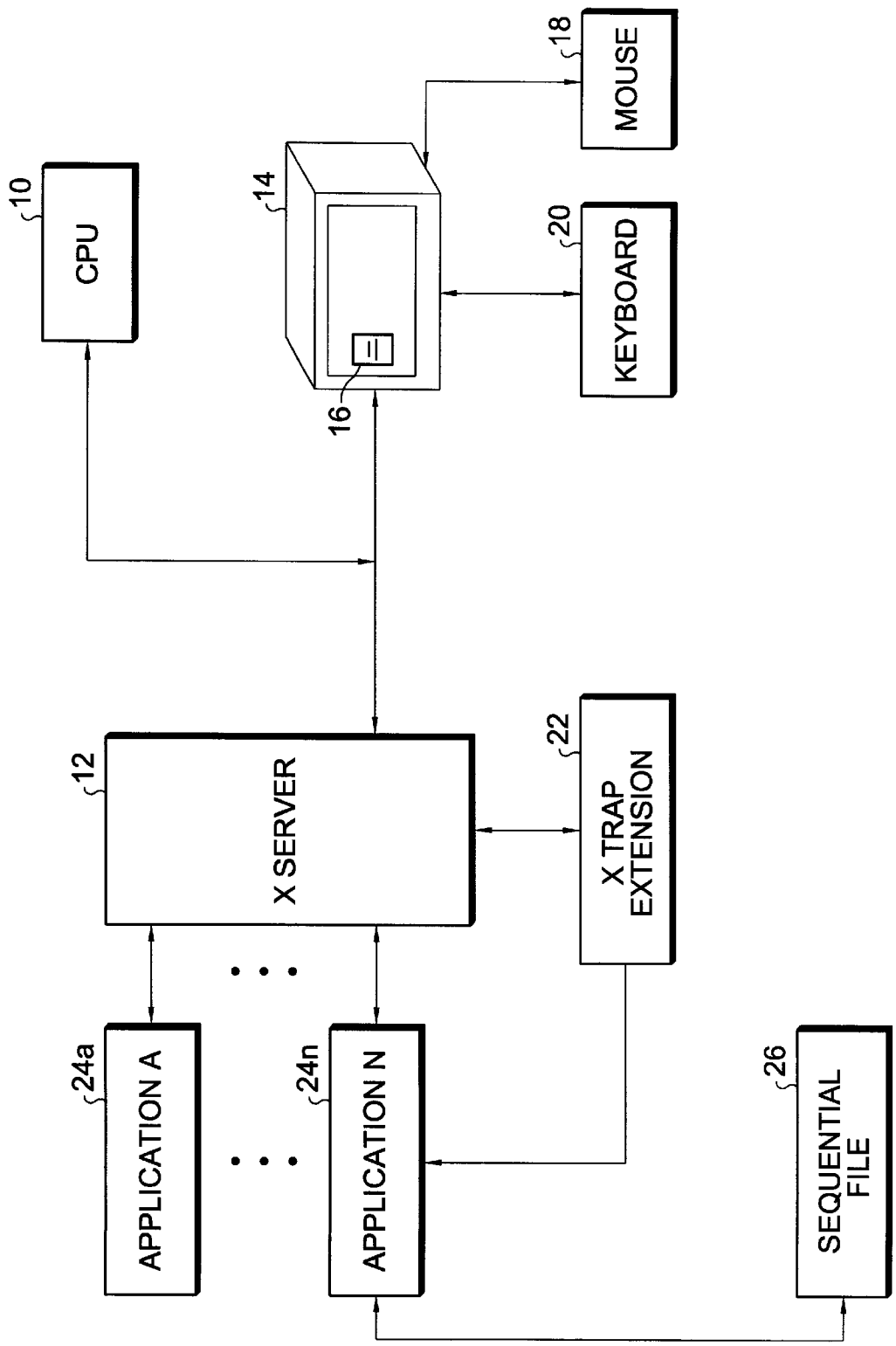
FIG. 1 shows the general operation of the server extension of this invention in use with a computer system.

FIG. 1. shows the general operation of the server extension architecture of the present invention in use with basic components of a computer system. A software configuration runs on a central processing unit 10 that interacts with an X server 12. The X server is a well known operating system program that controls a user interface of the terminal or work station 14 and utilizes windows 16 and a mouse 18 in addition to standard user interface elements such as a keyboard 20 or text. The X server 12 can support "extensions," or software modules that have access to X server variables, but which are not permanent parts of the X server. The extension 22 of this invention is referred to as the "XTrap extension." Those skilled in the art will know how to apply the teachings of this invention to other operating systems and servers.

A plurality of application programs 24A through 24N can be run on the central processor unit (CPU) 10. One application program or client 24N running on the CPU 10 acts as the controlling client of the XTrap extension 22, which is a software extension of the X server 12. Known software modules or extensions that perform operating system functions are controlled by the server, the XTrap extension 22 is controlled by a single application program or client 24N. The controlling client 24N sets the parameters of the XTrap extension 22 and turns the XTrap extension 22 on and off. User input from the mouse 18 or the keyboard 20 is initially received by the X server 12. The present invention is also applicable to operating systems with other input devices, as well as to operating systems with only one type of input device.

The XTrap extension 22 intercepts the input, reformats a copy of the input for use by its "write" routine, as more fully set forth below, and sends the original input to the server 12 for normal processing. Ultimately, the client 24A to 24N-1, the client being monitored or controlled, receives the original input and handles it according to its particular implementation.

Any client 24A through 24N-1 generates output in the form of protocol requests, usually to control some kind of screen output at the workstation 14. The controlling client 24N can simultaneously display the same output on a screen at another workstation (not illustrated). These output protocol requests cause the server to draw text, lines or other graphic elements on the display screen of the workstation 14. Although in the preferred embodiment the only communications between the application programs and the X server that XTrap intercepts are output protocol requests, the present invention could be used to intercept any communication between any client and the server. The X server 12 receives output protocol requests from an application program 24A-24N-1, and the XTrap extension 22 intercepts them before the X server processes them. As with input, the XTrap extension reformats a copy and sends the original back to the X server. Ultimately, the output reaches the screen of the workstation 14 to control the form of text, lines or erasures.

The XTrap extension 22 calls a "write" subroutine that is part of the code of the extension. XTrap has a different "write" routine for every communication channel over which XTrap can communicate with the controlling client. The controlling client can be at a remote location from XTrap, such as at the other end of a network line. This "write" routine sends he collected information on inputs and outputs to the controlling client 24N or to a sequential file 26.

Figure 2:
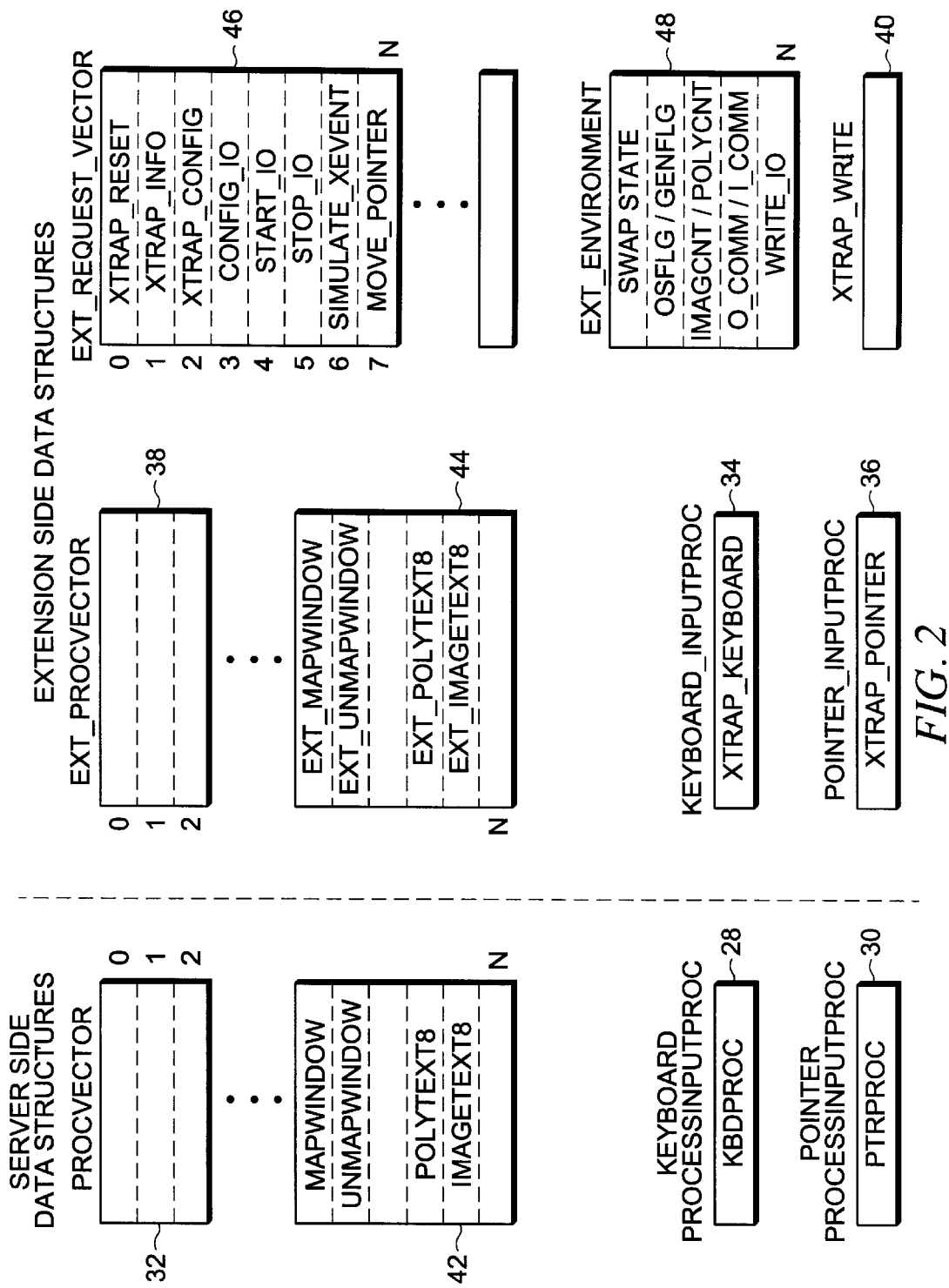

FIG. 2 shows the architecture of the XTrap extension and the server. The present invention is not limited to use with an architecture of this type, but will work on any operating system architecture that calls subroutines to process input and protocol request. The X server processes keyboard data by sending it to the routine whose address is stored in the "KeyBoard ProcessInputProc" storage location 28. The server handles mouse input in a similar way, i.e., by referencing the "Pointer ProcessInputProc" storage location 30. The X server processes output protocol requests by sending the appropriate information to the routine whose address is stored in a specified element of the "ProcVector" array 32.

The XTrap extension contains data structures that are one half the size as the X server data structures, however the size can be smaller or even identical. The XTrap data structures are also laid out in memory in the same or substantially the same configuration as the X server's data structures. A person skilled in the art will know how to use the teachings of this invention to provide means for mimicking the architecture of another operating system so that they call extension subroutines for processing input (and/or output) instead of its own, while at the same time providing a means for returning the operating system to its normal state after the use of the extension is completed. When XTrap is configured for intercepting keyboard input, the X server's storage location, "KeyBoard ProcessInputProc" 28 contains the address of the XTrap routine that handles keyboard input, and the XTrap version of this storage space, called "keyboard_inputproc" 34, stores the address of the X server's input-handling routine. If XTrap is configured for intercepting mouse-input, the X-server's storage location, "Pointer ProcessInputProc" 30 contains the address of the XTrap routine that handles mouse input, and the XTrap version of this storage space, called "pointer-inputproc" 36, stores the address of the X-server's input handling routine.

As can be seen from the above configuration, XTrap will intercept keyboard and mouse input. As explained above, when the X server receives keyboard input, it calls the routine whose address is stored in "KeyBoard ProcessInputProc" 28, and when it receives mouse input, it calls the routine whose address is stored in "Pointer ProcessInputProc" 30. Since during the implementation of XTrap these storage locations 28 and 30 contain the addresses of XTrap routines, the keyboard and mouse input is sent to the XTrap extension.

The XTrap extension intercepts client-generated output protocol requests by swapping the address of the XTrap extension output handling routine with the address of the X server output handling routine stored in data structure 32, referred to as "ProcVector". Each 4-byte value is an address of a routine that handles an output protocol request. In the preferred embodiment there are 256 4-byte addresses, but it is within the scope of the present invention to have smaller or larger arrays. Array element 42 contains the address for the routine that handles an "ImageText8" request. This routine draws a single string of text on the screen. If XTrap is configured for intercepting the "ImageText8" output protocol request, the value stored at this location is the address of an XTrap routine that draws a single string of text on the screen. This routine is called "ext_imagetext8". The address of the "ImageText8" routine is stored at the corresponding element 44 of the "ext_procvector" array 38 which is XTrap's version of the X server's "ProcVector" data structure 32. Thus, when the X server receives a request from any client to draw a string of text, it calls the routine that has its address stored in the element 42 of "ProcVector" 32. While XTrap is active that address will be the address of the XTrap routine, "ext_imagetext8"normally stored at element 44.

Other output protocol requests include for example, "PolyText8", which draws more than one string of text on the screen, "MapWindow", which prepares the server for drawing a window on the screen, and "UnmapWindow", which erases windows from the screen. The corresponding routines in the XTrap data structure 38 are "ext_polytext8", ext_unmapwindow" and "ext_mapwindow". Any other output protocol request can be intercepted by the XTrap extension in a similar fashion.

When the XTrap extension intercepts input or output, it creates a copy of the input or output information that is formatted for processing by XTrap's "write" routine that the client has configured. While XTrap is turned "on", the address of the "write" routine is stored in the "xtrap_write" vector 40. When XTrap is turned "off," "xtrap write" holds the address of a null routine, i.e., a routine that does nothing but return control to XTrap. In either case, if XTrap is configured to intercept any input or output, it sends a copy of formatted input or output to the routine whose address is stored in "xtrap_write".

The data structure "ext environment" 48 contains the XTrap internal variables. The variable "swap state" is a bit field which indicates which output protocol requests and input events are being intercepted. The "genflgs" variable is a bit field of general extension flags that enable and disable various features such as timestamp calculation, "window id" processing, and output format (i.e., binary or ASCII). "Window_id" processing, when enabled, causes XTrap to report which window is the object of a "MapWindow" or "UnmapWindow" output protocol request. The variable "osflg" is a bit field of implementation specific flags. The variable "imagcnt" holds the maximum number of characters that XTrap saves from a text string when XTrap intercepts an "ImageText" or a "PolyText" request. The saved characters are part of the information on output protocol requests that XTrap sends to the "write" routine. If "imagcnt" is negative, the characters are saved from the beginning of the string; if "imagcnt" is positive, the characters are saved from the end of the string.

The variable "polycnt" holds the maximum number of strings XTrap should process when XTrap intercepts a "PolyText" request. When the strings are processed, "imagcnt" characters are sent to the "write" routine. If "polycnt" is positive, strings are processed from the beginning of the string list; if "polycnt" is negative, strings are processed from the end of the string list. The variable "i_comm" contains an identifier for the communication channel being used for simulated input to XTrap. The variable "o_comm" contains an identifier for the communication channel being used for output from the XTrap extension. Finally, the variable "write_io" holds the pointer to the "write" routine that is placed in "xtrap_write" when XTrap receives a START_IO request.

Figure 3:
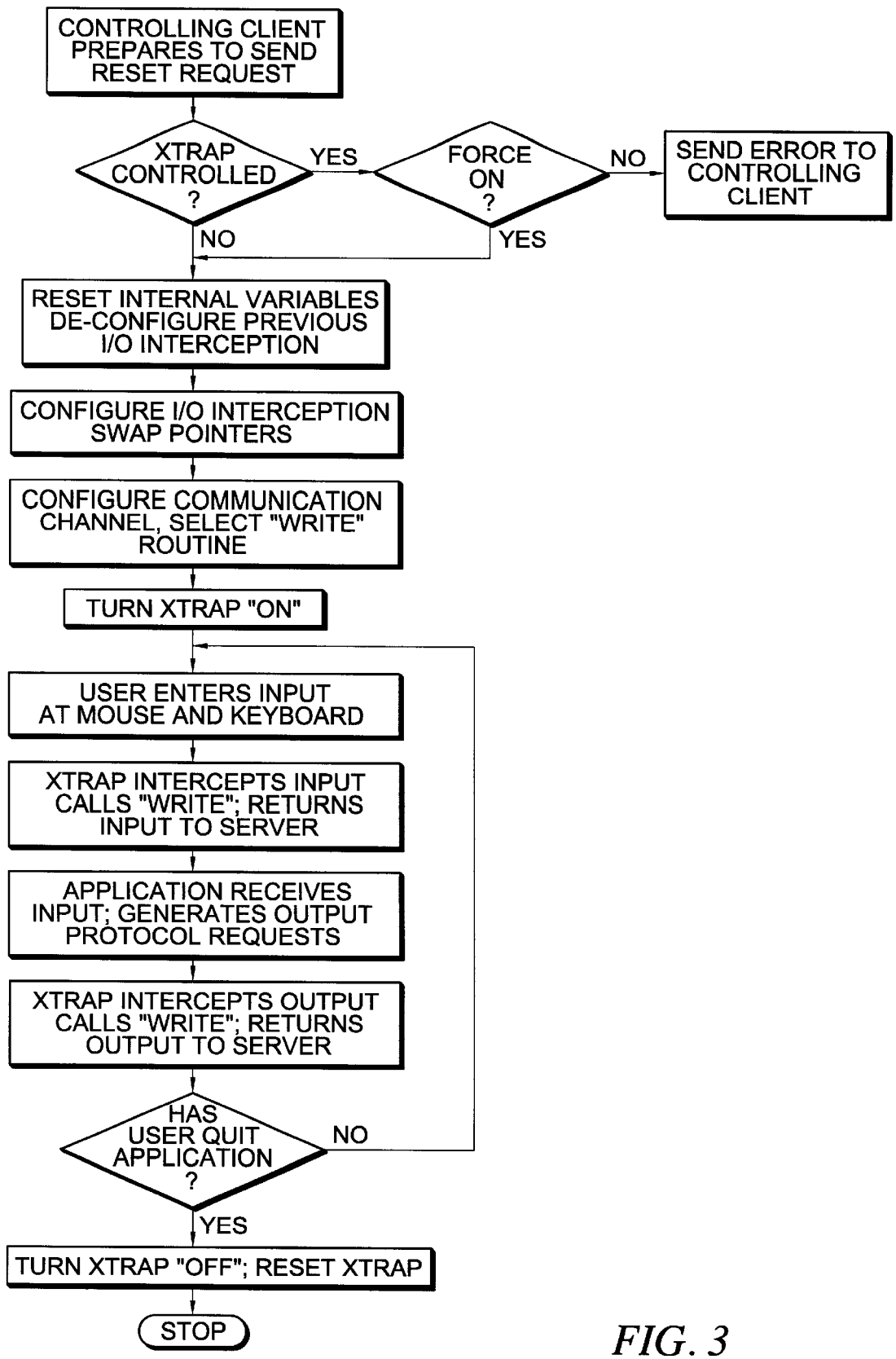
FIG. 3 is a process flow diagram showing an application program implementation of the server extension in one mode of operation.
Figure 4:
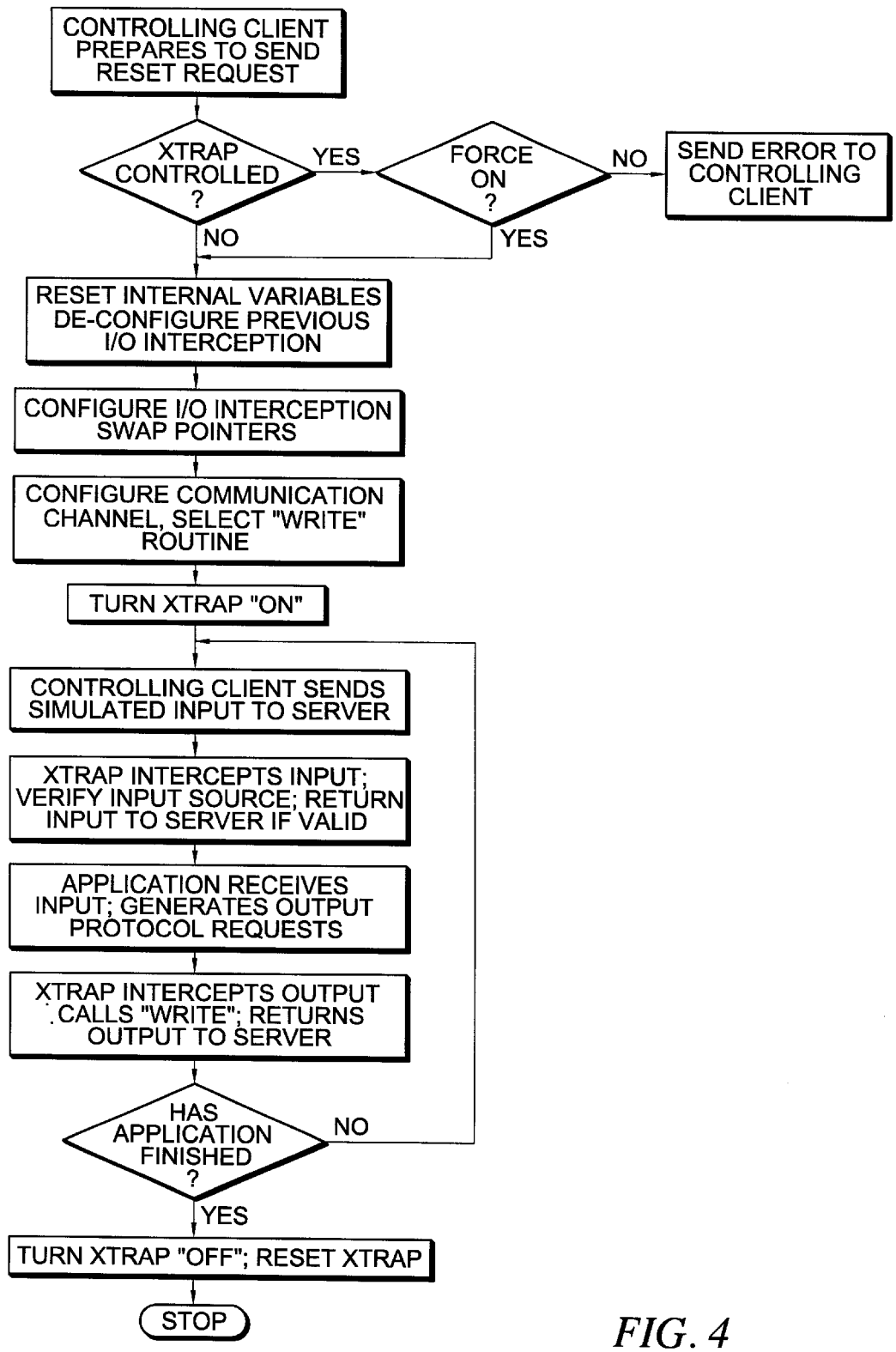
FIG. 4 is a process flow diagram showing an application program implementation of the server extension in another mode of operation.

FIGS. 3 and 4 are process flow diagrams showing an application program or controlling client configuration and use of the XTrap server extension in two different modes of operation. FIG. 3 is a process flow diagram showing the operation of the XTrap server extension when recording input events or output protocol requests are generated during a live user session referred to as the record mode of operation. FIG. 4 is a process flow diagram showing the operation of the XTrap server extension using the RTE, remote terminal emulation capabilities to simulate a live user session using simulated input events and waiting for incepted output events referred to as the playback mode of operation. The controlling client communicates with the XTrap extension by sending a data structure to the server via the XLIB xflush macro, which is documented in R. W. Scheiffler, J. Gettys, and R. Newman. *X Window System.* Digital Press (1988). The server then sends the data structure to the extension. Table 1 below shows the format of the data structure "xXtrapReq".

TABLE 1

The xXtrapReq data structure (short version)

```
typedef struct _xXtrapReq        /* 9 longwords in size     */
{
    CARD8 reqType;               /* Extension Major opcode  */
    BYTE minor_opcode;           /* Minor opcode of request */
    CARD16 length B16;           /* Initialized with 9      */
    union
    {
        union of various request data structur
    }
}
```

The first field, "reqType," identifies which XTrap extension the "xXtrapReq" data structure should be passed to. The client collects this identifier by calling "xQueryExtension," which is documented in R. W. Scheiffler, J. Gettys, and R. Newman. *X Window System.* Digital Press (1988). The second field, "minor_opcode," contains the identifier for the specific XTrap extension request the client is sending. Referring again to FIG. 2, the "ext_request_vector" array 46 contains a dispatch table that XTrap uses to look up the "minor_opcode" and to call the appropriate request processing routine. The third field, "length" is always 9 for XTrap requests. The fourth field, "data" is a union configured differently for each request. It contains the data specific to the request being sent. The present invention is not limited to the use of xflush for communicating with the extension.

Referring again to FIG. 3, the first step a client takes in configuring XTrap is to obtain the extension identifier by calling "xQueryExtension," which is documented in R. W. Scheiffler, J. Gettys, and R. Newman. *X Window System,* Digital Press (1988). Next the client requests the XTRAP_RESET request by setting the various fields of the "xXtrapReq" structure and sending it to the server via the xflush macro. The XTRAP_RESET request causes the extension to prepare itself for use by a new client. If a client is already using the extension and has previously configured itself as the controlling client, XTrap will check the "force" flag in the request. The "force" flag is part of the request-specific information that is sent to XTrap in the "RESET" union field of "xXtrapReq." (See Table 2)

TABLE 2

The xXtrapReq data structure
(long version-showing contents of the "data" union

```
typedef struct _xXtrapReq        /* 9 longwords in size     */
{
    CARD8 reqType;               /* Extension Major opcode  */
    BYTE minor_opcode;           /* Minor opcode of request */
    CARD16 length B16;           /* Initialized with 9      */
```

TABLE 2-continued

The xXtrapReq data structure
(long version-showing contents of the "data" union

```
    union
    {
        BYTE      buffer[32];  /* General Buffer            */
        RESET     reset;       /* Data for XTRAP_RESET      */
        INFOREQ   inforeq;     /* Data for XTRAP_INFO       */
        CONFIG    config;      /* Data for XTRAP_CONFIG     */
        IO        io;          /* Data for CONFIG_IO        */
        START     start;       /* Data for START_IO         */
        XINPUT    xinput;      /* Data for SIMULATE_        */
                               /* XEVENT and MOVE_          */
                               /* POINTER                   */
        TCP_IO    tcp_io;      /* Data for CONFIG_IO        */
        DNET_IO   dnet_io;     /* Data for CONFIG_IO        */
    } data;
} xXtrapReq;
```

If the "force" flag is set, XTrap will reset itself and remove itself from the control of the other client. If the "force" flag is not set, XTrap will return an error code to the client.

A client can prevent another client from gaining accidental control of an extension by setting the "control" flag during an XTRAP_RESET request. Setting the "control" flag causes the XTrap extension to ignore any subsequent XTRAP_RESET requests from another client unless the other client sets the "force" flag. The "control" flag, like the "force" flag is a part of the "RESET" union.

When the XTrap extension receives an XTRAP_RESET request, it resets XTrap's internal variables and flags to their default values, and undoes any configuration for intercepting input or output. All client programs send an XTRAP_RESET before they stop.

Once the XTrap extension is reset, the client sends an XTRAP_CONFIG request to set up the kind of input and output the extension is to intercept. For the XTRAP_CONFIG request, the "data" union of xXTrapReq" has the structure shown in Table 3.

TABLE 3

The CONFIG union

```
#define MAX_LIST      20
typedef struct                _config    /* used by XTRAP_CONFIG */
{
    FLAGS     flags;
    BITS      bits;
    CARD8     opcode_count;
    CARD8     pad_1byte;
    INT16     pad_1word;
    CARD8     list[MAX_LIST];
} CONFIG;
```

The "flags" field is used to enable and disable input and output interception and is shown in Table 4.

TABLE 4

The "flags" field of the CONFIG union

```
/*
 * This structure holds the defined bits for swapping
 * the various input and output routines for recording
 * and playback.
 */
typedef struct flags
{
    union
    {
        unsigned int mask;
        struct
        {
            /*
             * This word is used in a request to specify
             * the types of configuration information that
             * should be changed or updated. It is used
             * as a valid data check.
             */
            unsigned    v_kbd        :1;    /* keyboard input   */
            unsigned    v_ptr        :1;    /* pointer input    */
            unsigned    v_opcodes    :1;    /* output array     */
            unsigned    v_gen        :1;    /* general          */
            unsigned    v_os         :1;    /* specific (<<16)  */
            unsigned    v_poly       :1;    /* poly count       */
            unsigned    v_image      :1;    /* image count      */
            unsigned    pad0_9bits   :9;    /* pad to abort     */
            /*
             * These bits determine if the
             * particular field should be
             * set or cleared (if applicable)
             */
            unsigned    s_kbd        :1;    /* keyboard input   */
            unsigned    s_ptr        :1;    /* pointer input    */
            unsigned    s_opcodes    :1;    /* output array     */
            unsigned    s_gen        :1;    /* general (16)     */
            unsigned    s_os         :1;    /* specific (<<16)  */
            unsigned    ignore_poly  :1;    /* poly count       */
```

TABLE 4-continued

```
          The "flags" field of the CONFIG union
    unsigned          ignore_image    :1;    /* image count   */
    unsigned          pad1_9bits      :9;    /* pad to abort  */
  } bit;
 } use;
} FLAGS;
```

Setting the "v_kbd" flag causes XTrap to set the state of keyboard input interception according to the state of the "s_kbd" flag. If "s_kbd" is on, keyboard input interception is enabled. It it is off, keyboard-input interception is disabled. Mouse input is similarly controlled with the "v_ptr" and the "s_ptr" flags. The pair of flags, "v_opcodes" and "s_opcodes", act in the same way to enable or disable the interception of output protocol requests listed in the "list" field of the "CONFIG" structure shown in Table 3.

The XTRAP_CONFIG request can also configure the extension to take a millisecond timestamp of any intercepted input or output protocol request. XTRAP_CONFIG also provides some control over the form of output generated by XTrap, namely over the choice between ASCII format and binary format.

When the XTrap extension receives an XTRAP_CONFIG request, it performs the swap operation that exchanges the address of the XTrap input or output processing routine with the address of the X server's input or output processing routine, for each type of input and output protocol request selected by the client. For example, if the client set flags "v_kbd" and s_kbd" in its XTRAP_CONFIG request, then, referring to FIG. 2, XTrap will exchange the "KbdProc" pointer in vector "KeyBoard ProcessInputProc" 28 for the pointer "xtrap_keyboard" in "keyboard_inputproc" 34. If the client set flag "v_kbd" but left flag "s_kbd" unset, the two pointers would be unswapped. The XTRAP_RESET request also causes XTrap to unswap "KeyBoard ProcessInputProc" and "xtrap_keyboard.".

Next, the client sends a CONFIG_IO request to XTrap to specify over what kind of communication channel to send information on collected input and output to the controlling client. When XTrap receives this request, it sets its internal variable "write_io" (48 on FIG. 2) to the value of a pointer to a "write" routine. This routine is used to send the information on intercepted input events and output protocol requests to the controlling client via the configured communication channel. In record mode, the client records the information in a sequential file. In playback mode, the controlling client uses the information received via the configured "write" routine to verify that simulated input was sent to the server. This allows the controlling client to ensure that the server will ignore input from the keyboard or the mouse when, for security or other reasons, this is necessary. The client also uses the information to monitor output protocol requests to ensure that it waits to send the next input event until after the last output protocol request has been processed. In playback mode the controlling client may also record the information to a sequential file. For example, if the last output protocol request was a request for a "$" prompt, the client must wait until the "$" appears on the screen before it sends the next input event.

In playback mode, the CONFIG_IO request is made to implement Remote Terminal Emulation (RTE). Table 5 shows the structure of the "data" union of "xXtrapReq" for the CONFIG_IO request.

TABLE 5

The IO union

```
#define IO_BUFFER_SIZE 28
typedef struct              _io       /* used by CONFIG_IO */
{
    CARD8     transport;
    CARD8     direction;
    CARD16    pad_s;
    BYTE      buffer[IO_BUFFER_SIZE]
} IO;
/*
 *   Values for use in the direction field.
 *   The communication mode specified in the
 *   transport field will be used to configure
 *   the input and/or output channels specified
 *   in the direction field.
 */
#define IO_DIR_IN           (1<<0)   /* Configure for input */
#define IO_DIR_OUT          (1<<1)   /* Configure for output */
#define IO_DIR_BOTH         (IO_DIR_IN | IO_DIR_OUT)
```

The "transport" field contains a decimal value describing the type of communication channel being configured. Examples of communication channels include asynchronous terminal lines, sequential files, TCP/IP networks, VMS mailbox connection, XLIB transport and DECnet Task-to-Task Communication. Input sent via XLIB transport is sent via the xflush macro using a SIMULATE_XEVENT request or the MOVE_POINTER request, discussed below. It can be seen that by using sequential files as the source for keyboard and mouse input, an application program can be performance tested without a live user. Furthermore, software regression and comparative testing are simplified. The "direction" field specifies whether the CONFIG_IO request applies to input, output or both.

Once the XTrap extension is configured, the client makes the START_IO request to start I/O over the communication media configured with the CONFIG_IO request and to initiate the "write" routine that sends input and output information to the controlling client. The only data specified with this request are (1) the number of characters the extension should save from an intercepted text string that is part of an output protocol request, and (2) the number of text strings the extension should process when the extension intercepts "PolyText8", output protocol request that request the server to draw more than one string of text on the screen. (See Table 6).

TABLE 6

The START union

```
typedef struct  _start      /* used by START_IO */
{
    INT16     imag_count;
    INT16     poly_count;
} START;
```

When the controlling client has completed its remote control or monitoring of a workstation that requires XTrap implementation, the client should send a STOP_IO request to the XTrap server extension via the xflush macro. This causes character flow to and from the IO channels to stop. Before the client is ready to stop execution, it should send an XTRAP_RESET request to the XTrap extension in order to unswap any input or output processing routines.

The controlling client can send the XTRAP_INFO request whenever the controlling client needs to know the values of any internal variables.

The controlling client can use the SIMULATE_XEVENT and the MOVE_POINTER requests in playback mode to send input to the X server via XLIB. Table 7 shows the format of the "data" union of the "xXtrapReq" structure for use with SIMULATE_XEVENT and MOVE_POINTER. SIMULATE_XEVENT is used to send keyboard events and mouse click events.

TABLE 7

The XINPUT union

```
/* used also by MOVE_POINTER */
typedef struct    _xinput
{
    CARD8   type;
    CARD8   detail;
    CARD16  x;
    CARD16  y;
    CARD16  pad_s;
} XINPUT;
```

MOVE_POINTER is used to send mouse motion events. The variable "type" is set to the value of an identifier for the type of event being sent, which, in the case of a MOVE_POINTER request, is a mouse motion event. The variable "detail" is set for the value of an identifier for the key or mouse button pressed or released in a SIMULATE_XEVENT request. The variables "x" and "y" are set to the destination screen coordinates of the mouse cursor.

The foregoing description of the invention has been presented for purposes of illustration and description. It is not intended to limit the invention to the precise forms disclosed, and obviously many modifications and variations are possible in light of the above teachings.

What is claimed is:

1. A server extension for use in a computer system having a host computer for executing application programs, screen means for displaying text or graphic figures, at least one application program executing on said host computer for generating output protocol requests, a controlling application program executing on said host computer for generating inputs and extension protocol requests, a server comprising a portion of memory having addressable locations and a plurality of server routines each having an address, said server having performance characteristics that are variable over a range, said server receiving said inputs, transferring said inputs to said application program, receiving said output protocol requests and transferring said output protocol requests to said screen means, said server extension comprising:

an extension portion of memory directly connected to said controlling application program for creating a record of said performance characteristics for use in evaluating whether said performance characteristics are within an acceptable range by monitoring one of said server and said application program, said extension portion formatting display of said text or graphic figures on said screen means;

said extension portion of memory having specific memory locations for data storing that correspond to specific memory locations in said server portion of memory;

a plurality of extension routines each having an address, each of said extension routines corresponding to one of said server routines;

said addresses for said plurality of server routines being stored in said extension portion of memory and said addresses for said plurality of extension routines being stored in said server portion of memory;

said inputs and said output protocol requests each being directed to one of said server routines;

said extension receiving said extension protocol requests from said controlling application program for configuring and controlling said extension; and said extension intercepting said inputs and said output protocol requests from said controlling application program and redirecting said inputs and said output protocol requests to one of said extension routines, said one of said extension routines corresponding structurally to the server routine to which said inputs and output protocol requests are directed, said extension reformatting said inputs and said output protocol requests for monitoring said server, for monitoring the performance of said application program or for formatting display of said text or graphic figures on said screen.

2. A method of operating a server extension for use in a computer system having a screen for displaying text or graphic figures, a host computer for executing application programs, at least one application program executing on said host computer for generating output protocol requests, a controlling application program executing on said host computer for generating inputs and extension protocol requests, a server comprising a portion of memory and having performance characteristics that are variable over a range, said server having a plurality of server routines each having an address, said inputs and said output protocol requests each being directed to one of said server routines, said server extension comprising an extension portion of memory directly connected to said controlling application program, said server portion of memory having specific memory locations for data storing that correspond to specific memory locations in said extension portion of memory, said server extension having a plurality of extension routines each having an address, each of said extension routines corresponding structurally to one of said server routines, said method comprising the steps of:

receiving said extension protocol requests from said controlling application program;

configuring said extension portion of memory in response to said extension protocol requests;

receiving said inputs and said output protocol requests from said server;

redirecting said inputs and said output protocol requests to one of said extension routines, said one of said extension routines corresponding to the server routine to which said inputs and output protocol requests are directed;

reformatting said inputs and said output protocol requests for monitoring said server, for monitoring the performance of said application program or for formatting display of said text or graphic figures on said screen; and creating a record of said performance characteristics for use in evaluating whether said performance characteristics are within an acceptable range.

* * * * *